United States Patent [19]

Callahan

[11] Patent Number: 4,952,111

[45] Date of Patent: Aug. 28, 1990

[54] PICK UP AND STACKING DEVICE FOR LARGE HAY BALES

[76] Inventor: Dean Callahan, P.O. Box 205, Royal City, Wash. 99357

[21] Appl. No.: 245,706

[22] Filed: Sep. 19, 1988

[51] Int. Cl.$^5$ .............................................. B65H 67/00
[52] U.S. Cl. ..................................... 414/111; 414/551; 414/555; 414/486; 414/917; 414/789.7
[58] Field of Search ...................... 414/24.5, 111, 546, 414/551, 555, 789.7, 789.8, 792.9, 486, 917

[56] References Cited

U.S. PATENT DOCUMENTS

| | | | |
|---|---|---|---|
| Re. 31,178 | 3/1983 | Deacon | 414/917 X |
| 2,491,079 | 12/1949 | Brestland | 414/551 X |
| 2,758,729 | 8/1956 | Van Dusen | 414/555 |
| 2,954,886 | 10/1960 | Nelson | 414/24.5 |
| 3,373,882 | 3/1968 | Forest | 414/790.3 |
| 3,946,887 | 3/1976 | Parker | 414/555 X |
| 4,082,192 | 4/1978 | Cox | 414/24.6 |
| 4,084,707 | 4/1978 | McFarland | 414/24.6 |
| 4,103,794 | 8/1978 | Shaw | 414/551 X |
| 4,120,405 | 10/1978 | Jones et al. | 414/24.5 |
| 4,128,179 | 12/1978 | Gilbert | 414/917 X |
| 4,358,235 | 11/1982 | Butler et al. | 414/24.5 |
| 4,376,607 | 3/1983 | Gibson | 414/111 |
| 4,426,183 | 1/1984 | Butler | 414/24.5 |
| 4,498,829 | 2/1985 | Spikes | 414/24.5 |
| 4,534,691 | 8/1985 | Miguel | 414/111 |
| 4,578,008 | 3/1986 | Gleason | 414/24.5 |
| 4,579,503 | 4/1986 | Disque | 414/917 X |
| 4,594,041 | 6/1986 | Hostetler | 414/555 X |
| 4,710,087 | 12/1987 | Naaktgeboren et al. | 414/789.7 |
| 4,722,651 | 2/1988 | Antal | 414/555 X |
| 4,844,675 | 7/1989 | Strosser et al. | 414/917 X |
| 4,854,807 | 8/1989 | Rhodes | 414/917 X |

FOREIGN PATENT DOCUMENTS

| | | | |
|---|---|---|---|
| 212471 | 1/1958 | Australia | 414/551 |
| 1264883 | 5/1961 | France | 414/486 |

*Primary Examiner*—H. Grant Skaggs
*Assistant Examiner*—Boris Milef
*Attorney, Agent, or Firm*—Keith S. Bergman

[57] ABSTRACT

A self-propelled vehicle for picking up and stacking large hay bales of a one-ton size is disclosed. The vehicle has a pivotally mounted stacking bed that receives bales in a horizontally arrayed matrix and pivots to deposit the arrayed matrix in a vertical orientation for storage. Forward pick up mechanism provides a pivotally mounted mast carrying paired spaced squeeze arms in its outer portion to cooperatively pick up a bale forwardly of the vehicle and pivotally move that bale upwardly and rearwardly to the stacking bed for deposition thereon. Bale moving mechanism positions bales on the stacking bed in proper matrix position. Hydraulic powering and control circuits provide automatic and semi-automatic operation of the various mechanisms of the device.

2 Claims, 4 Drawing Sheets

PICK UP AND STACKING DEVICE FOR LARGE HAY BALES

BACKGROUND OF THE INVENTION

1. Related Applications

There are no applications related hereto heretofore filed in this or any foreign country.

2. Field of Invention

My invention relates generally to vehicular-type hay bale accumulators and stackers and more particularly to such a device that picks up, accumulates in ordered array and stacks large one-ton hay bales.

3. Background and Description of Prior Art

In modern day agriculture the handling of hay has become increasingly mechanized and a substantial efficiency in such endeavors is a requirement for economic survival. Responsively, the forms in which processed hay has come to exist have progressed through an original amorphous fungible mass to various amassed coherent configurations that may be more readily dealt with by modern machinery. One group of such amassed configurations has evolved in the form of bales of various sorts. With the increased sophistication of hay handling, these bales have tended to increase substantially in size from an early mass of about sixty to eighty pounds to a present day mass of approximately two thousand pounds. Such bales have been created in many and various configurations and forms, but the most popular is that of an elongate rectilinear solid having dimensions of about 4×4×8 feet which, when formed with ordinary compression from average hay materials, will weigh approximately in the range of two thousand pounds. Such bales are commonly formed with automatic machinery that deposits them after formation in random fashion on the earth of a field in which the hay grew. My invention provides a vehicular-type device to move about a field to pick up such bales, array them in an ordered matrix, and deposit such accumulated matrix of bales at a distant point for storage or further operation.

Such devices are commonly known as bale accumulators and various progenitors have heretofore become known especially as created for use with smaller bales of the 80 pound variety. Such known accumulators have generally picked up bales from the ground by moving the lower portion of an angulated conveyor against the lower portion of a bale resting on the earth with sufficient force to cause the bale to rise slightly and be engaged with the conveyor for lifting onto the accumulator structure. This method of picking up a hay bale is not particularly applicable to the larger bales of one ton size as it is difficult to create enough impact type force to raise the larger bale in the same fashion as a smaller bale and if such force be created, it in general will do substantial damage to the accumulator, the bale or both.

My invention resolves this problem by providing a grasping and lifting structure that extends forwardly of an accumulator vehicle to pick up a bale in a position visually observable by an operator forwardly of the accumulator. The pick up structure provides a back plate with spaced opposed forwardly extending arms that are hydraulically movable toward each other and against the bale to squeezably engage it and then move it upwardly and rearwardly and deposit it on a stacking bed rearwardly of an operator's cab. The particular motions involved from initial bale engagement to deposition may be automated by position-sensitive control valves.

My invention also picks up and deposits bales without damage to the bales themselves. In general in their formation process, rectilinear are compacted in a direction parallel to their longer axis and by reason of this, the ties that hold the bales together must necessarily extend parallel to that longer axis to be effective. When such bales are picked up by a conveyor-type device, the conveyor normally contacts a smaller end as opposed to a larger side of a bale, and in so doing may contact the bale ties to oftentimes causes disruptive forces that break bale ties which tends to allow a bale to change its configuration or completely fall apart. Impact forces themselves tend to do this when a ramp-like part of a conveyor contacts a bale and the process is further enhanced when the bale enters the conveyor structure, as the conveyor generally must provide some engaging contact such as a tooth or cog structure.

Known pick up devices for large bales have commonly been associated with cylindrical-type bales which have heretofore been popular. These cylindrical bales have an axial void, or at least an axially symmetrical structure, that allows insertion of tines along the medial axis of such a bale without disruption of the bale or breaking of circular ties about its periphery. Such pick-up devices, however, are generally not effective for use with rectilinear bales which do not provide any medial permeable area where tines may be inserted and if tines are inserted in rectilinear bales, they in general will be disruptive of the bale structure and the ties holding the bale together.

Other mechanisms for moving large bales about a farming operation have become known, but they in general are distinguished from the bale moving mechanism of my accumulator in that they do not accomplish the same bale motion or positioning. Bale moving devices have commonly been associated with tractors or similar vehicles to translocate individual bales. These devices generally have provided means of picking up a bale and raising it a short distance above a supporting surface to allow it to be moved, but in general have maintained the bale forwardly and at or below the level of a vehicle operator where it may be observed at all times. My invention, however, must pick up a bale forwardly of the operator, raise it upwardly and rearwardly and then deposit it on an accumulator bed rearwardly of an operator. The bale deposition must also orient the bale in a particular spacial orientation relative to the accumulation bed and other bales being stacked on that bed. This motion requires not only the picking up of a bale, but also its positional orientation and particular course of transit to distinguish my pick up mechanism from the ordinary translocation devices used with larger hay bales for transportation or positioning.

The disposition of bales and their positioning on the accumulator bed of my invention is more critical and must be more accurate then required for small bale accumulators. If positioning of a bale in a small accumulator is not correct or if the bale tips or falls, its positioning may quite readily be manually corrected by a workman. This, however, is not the case with large bales approximating a weight of two thousand pounds, as such bales may not generally be manually manipulated by one or even several workmen without aid of additional apparatus or mechanism which generally is not available in the field where such happenings occur. My invention solves this problem by accumulating and stacking bales in the forward portion of an elongate, rearwardly extending stacking bed so that there is always a forward guide and an end gate or a column of bales rearwardly of the stacking position to assure the correct positioning of a bale being placed on the stacking bed. This arraying of elements in the stacking procedure creates a bin-like void where a new bale is placed so that it is very nearly impossible to misplace the bale or for it to turn or tip in any improper fashion.

My invention resides not in any one these features, but rather in the synergistic combination of all of its structures that give rise to the functions necessarily flowing therefrom as hereinafter more fully specified and claimed.

SUMMARY OF INVENTION

My invention generally provides a vehicle having an operator cab in one forward lateral part with an arm-type pick up mechanism in the other forward lateral part extendable forwardly of the vehicle to pick up large hay bales, move them upwardly and rearwardly, and deposit them for accumulation on a stacking bed rearwardly of the operator compartment.

The pick up mechanism is hydraulically operated responsively to bale contact with a first position-sensitive switch associated therewith to engage, pick up, and move a bale and by a second position sensitive control valve to release that bale when it is appropriately positioned relative to the accumulation bed. The accumulation bed receives bales in its forward portion in two-bale high columns and has means of moving each column of bales rearwardly to accumulate a load four columns deep and two bales high. The bale positioning means on the stacking bed are hydraulically powered responsive to manual or automatic controls.

The accumulation bed is pivotally mounted in its rearward part to tilt substantially vertically in a rearward direction to deposit an amassed array of accumulated bales in a stacked array two bales deep and four bales high by turning the accumulated array perpendicularly to their stacked position.

Hydraulic powering means for the accumulator are carried by the vehicle and operate responsively to a semi-automated control system that may be manually overridden.

In creating such a device, it is:

A principal object of my invention to provide a vehicular-type pick up and accumulating device for large one-ton rectilinear hay bales of approximately a 4×3×8 to 4×8×8 foot size.

A further object of my invention to provide such a device that picks up bales from their earth support in a field by two opposed squeeze arms to avoid disruption of the bale structure or breaking of the bale ties.

A further object of my invention to provide such a device with an operator cab in a forward lateral portion, immediately rearwardly of the pick up area, where an operator may observe the entire bale pick up operation for supervisory manual control, if required.

A still further object of my invention to provide such a device that has a pivotally mounted tiltable accumulation bed immediately rearwardly of the operator cab to accumulate bales in a rectilinearly arrayed matrix with their longer 8 foot dimensions horizontal.

A still further object of my invention to provide such an accumulation bed that tilts rearwardly to a substantially vertical angle to deposit an accumulated array of bales in a vertical stacked array, rotated through a right angle from their accumulated array, while maintaining the 8 foot dimension of the bales horizontal.

A still further object of my invention to provide such a device that is powered hydraulically and controlled by control valves sensitive to bale position for semiautomatic operation that may be manually overridden.

A still further object of my invention to provide such a device that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings, as is required.

BRIEF DESCRIPTION OF DRAWINGS

In the accompanying drawings which form a part hereof and wherein like numbers of reference refer to similar parts throughout:

FIG. 6 is an enlarged, partial isometric view of the mounting and activating structure of the bale pick up arm, with various surrounding vehicular portions removed for clarity of illustration.

DESCRIPTION OF THE PREFERRED EMBODIMENT

My invention generally provides wheeled vehicle 10 defining an operator cab in its forward portion with pick up member 11 extending forwardly and accumulation bed 12 carried rearwardly, both operatively powered by hydraulic system 13.

Vehicle 10 provides a self-powered truck-like mechanism having frame 14, of an opposed lateral beam type, carrying similar laterally opposed wheel trucks 15 in its forward part and wheel trucks 16 in its rearward part. The frame supports operator cab 17 in a forward lateral position immediately rearwardly of the forward wheel trucks and, for convenience, the motor of the vehicle is preferably located below the cab structure. The truck frame provides appropriate subframe elements 18 to mount various of the elements of my invention hereafter described. The vehicle itself is not described in detail as, though it is manufactured for its specific purpose and not a standardized commercial product, its structure is not remarkable and in essence at least is well known in the vehicular arts and in various hay bale pick up and accumulation devices heretofore known and used.

The motor of the vehicle must be of sufficient size to propel the vehicle with its ordinary loads over areas that it is required to traverse in picking up bales and must also furnish sufficient additional power to operate the hydraulic system of the device. This requires a motor of substantial size as the vehicle itself is large, its loads are heavy and the demands of the hydraulic system are substantial. The vehicle should provide the normal apparatus and conform to the normal limitations of vehicular trucks. Though the vehicle may be operated only or largely on private land, it commonly is more convenient if it may also operate upon public roadways and to allow this, the vehicle should provide the normal amenities required by existing law for it to so do.

Pick up mechanism 11 provides pick up arm beam 22 pivotally carried by journal 20a in bearings 20b on frame 14 laterally adjacent the rearward portion of cab 17 and immediately forwardly of accumulator bed 12. The pick up arm beam is of a box-type configuration and has a length sufficient to extend forwardly of the forward portion of vehicle 10 when the beam be in a lowered position.

The forward portion of the vehicle structure laterally of cab 17 defines pick up arm channel 21 which allows the pick up arm to extend pivotally downwardly so that its forward end portion may contact the lower portion of a bale immediately forwardly of vehicle 10 where the bale is to be picked up. This construction requires that cab 17 be laterally adjacent the pick up arm channel and also requires that the forward wheel axle be positioned so as not to interfere with the motion of the pick up arm.

Pick up arm 22 is powered for pivotal motion by paired spaced pick up arm cylinders 24 pivotally connected to that arm by journals 25a carried in bearing ears 25b on the arm at a spaced distance above its pivotal journal 23. The lower ends of pick up arm cylinders 24 are carried by journals 26 supported on subframe elements 18a forwardly and below pick up arm journal 25, so that the cylinders extend in an upward and rearward angulated fashion, as illustrated, to allow powered upward and rearward motion of the pick up arm from its forwardly extended position.

Upper pick up arm cylinder bearing ears 25b are carried by spaced supports 27 extending laterally on each side of the lower portion of the pick up beam. The upper portions of supports 27 extend somewhat above the cylinder bearing ears 25b to contact pick up arm return springs 28 carried in spaced adjacency in cylindrical spring housings 29 by vehicle subframe 18, in a position such that each spring communicates with the uppermost portion of one support 27 when that support is in a partially raised position. These springs are compressed as the pick up arm moves to its rearwardmost position so that they bias the pick up arm to a forward position and move it in that direction when hydraulic force is removed from that arm after bale disposition on the accumulator bed.

Elongate control arm 30 is pivotally journaled on supports 31 so as to position journal 32 carried by vehicle frame 14 vertically above pivot arm journal 23 to allow the control arm to extend parallel to the pick up arm in a position spacedly thereabove. The length of control arm 30 is substantially the same as that of the pick up arm 22. The forward end of pick up arm 22 in its lower medial portion carries bale plate 33 by means of intercommunicating linkage 34 linking the two elements in a pivotal relationship. This linkage may be fixed or releasable as desired. The forward portion of control arm 30 is journaled in the medial rearward portion of the bale plate upon pin 35 carried in fastening ears 36 structurally communicating with the bale plate back and positioned to maintain the parallel relationship between pick up arm 22 and control arm 30.

Bale arm beam 37 is carried by the rearward, vehicle facing surface of bale plate 38 immediately upwardly adjacent the lower edge of that plate. This beam is a compound structure having larger portion 37a slidably carrying smaller portion 37b for extension and contraction responsive to motion of hydraulic cylinder 38 carried within the larger portion of the beam. Beam portion 37b must be movable relative to the bale plate 33 and must therefore be supported in a slidable fashion relative to the bale plate. This bale arm structure allows adjustment of the distance between the bale arms to accommodate bales of varying length. Most bales are of a reasonably standard eight foot length and if all bales are of this length, the adjustable features are unnecessary, but commonly in practice there is some variation that requires accommodation.

Similar paired opposed bale arms 38, that are mirror images of each other, are pivotally carried by pins 40 in the respective lateral end portions of bale arm beam 37. The bale arms have a slightly inturned forward end portion 41 and preferably provide a plurality of spaced teeth 42 on their inner facing surfaces to aid in engaging and maintaining a hay bale therebetween. The rearward portions 43 of the bale arms extend rearwardly of their pivot pins 40 to there pivotally interconnect by pins 44 with one end of paired opposed bale arm cylinders 45. The other end of the bale arm cylinders is carried by medial fastening brackets 46 supported on bale arm beam 37. With this structure the bale arm cylinders 45 may extend to pivotally move the forward parts of the bale arms toward each other to engage a bale therebetween and may move in the opposite direction to release that bale.

The forward medial portion of back plate 38 carries plunger 47 associated with a position sensing hydraulic control valve, as hereinafter more fully described, to sense position of a bale adjacent the bale plate to automatically close the bale arms to engage that bale.

Accumulation member 12 provides planar accumulation bed 48, pivotally mounted by depending brackets 49 carried in its rearward part, upon the rearward end portion of the lateral beams of vehicle frame 14. Bed structure 48 is commonly formed with a peripheral frame supporting a plurality of floor elements extending therebetween normally in an elongate direction and has some substantial thickness to accommodate mechanism that it must support and to provide the strength and rigidity required of it.

The accumulation bed carries forward upright structure 50 extending upwardly from its forward edge and this structure preferably has forward angling top portion 51 to aid in directing bales deposited from above the forward portion of the bed rearwardly of the upright structure. The bed carries a substantially vertical rear bale support structure providing upwardly extending fence elements 52 carried in transversely extending base structure 53 which is slidably movable in an elongate forward-rearward direction along the accumulation bed responsive to action of hydraulic cylinders (not shown).

The forward portion of the stacking bed 48 is selectively raisable about pivots 49 responsive to a raising lever system 54 operated hydraulically by the hydraulic system of the accumulator. Raising system 54 is so configured as to raise the forward portion of the accumulation bed sufficiently that the bed will assume a substantially vertical position to allow deposition of an amassed array of bales thereon, with the bale surfaces originally resting on the stacking bed being vertically oriented in the stack. This stacking bed structure is not described in detail as it is not remarkable and similar structures have heretofore become known and used in bale accumulators, especially for smaller sized bales of the eighty pound variety.

The dimensioning of the accumulation bed is not particularly critical to my invention, but it does have some limits for practical use with larger hay bales approximating two thousand pounds in weight. Generally such bales are eight feet long and normally the accumulation bed is of this width to accommodate such bales. This width allows use of my mechanism on highways and maintains the total weight of accumulated bales on the stacking bed within reasonable limits for support by normal structures. The length of the bed in a forward-rearward direction is slightly longer than sixteen feet so that the bed may accommodate four columns of bales in a forward-rearward direction and its vertical support elements should be such that two rows of bales may be accommodated in a vertical direction. This allows accumulation of a $2 \times 4$ arrayed matrix of $4 \times 4 \times 8$ foot bales and an array greater by one tier or one row, depending upon orientation, of $3 \times 4 \times 8$ foot bales. There is no particular standardization for the configuration of one ton bales of hay, but most such bales of present day commerce are normally either $4 \times 4 \times 8$ or $3 \times 4 \times 8$ feet in dimension.

Figure 8:
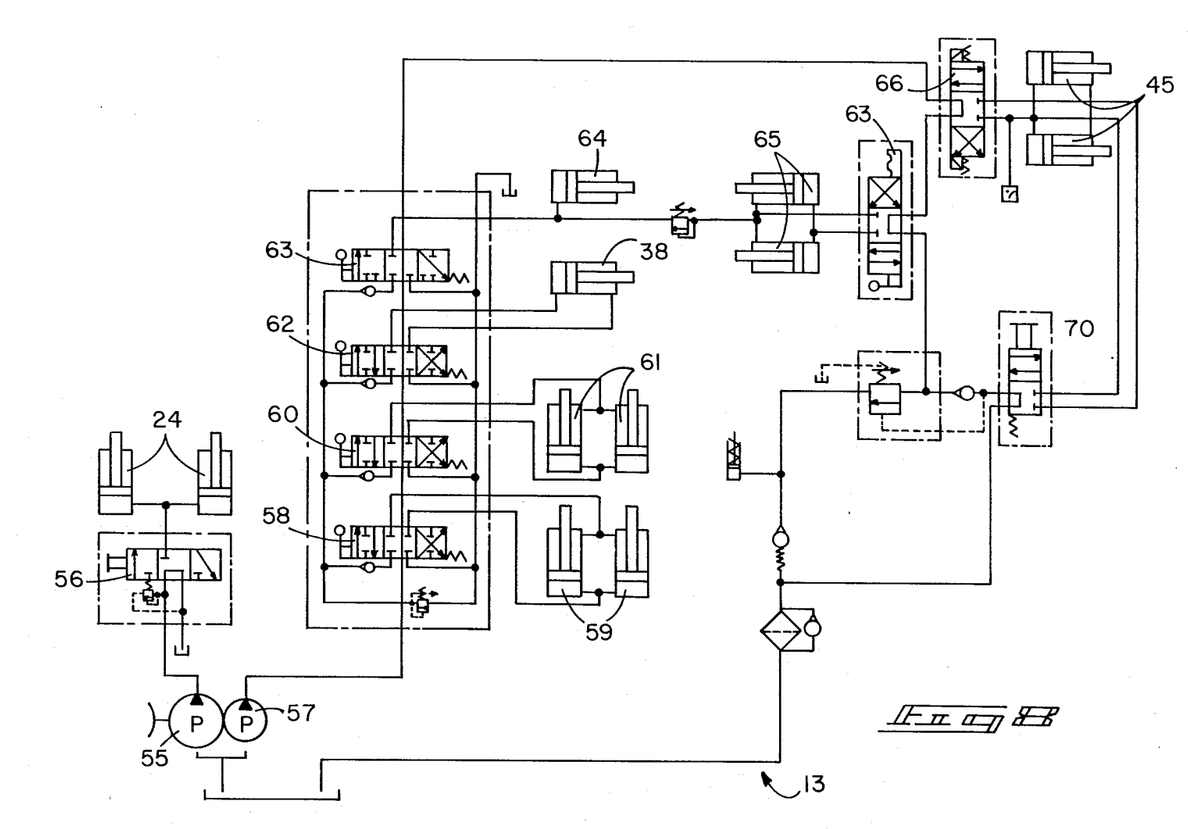
FIG. 8 is a diagram in normal symbology of the hydraulic operating system of my invention.

The hydraulic system that is operative with my invention is shown in the diagrammatic illustration of FIG. 8. The particular hydraulic system illustrated is a continuous flow, by-pass system to accommodate the heavy fluid use of my mechanism and to provide power necessary to operate a larger hydraulic system. The particular hydraulic system illustrated, however, is only one of various such systems that may accomplish the ends of my invention and it, itself, is not remarkable nor unique. Various other systems undoubtedly may accomplish the same purposes.

In FIG. 8, larger pump 55 supplies fluid through valve 56 in parallel to the paired bale lift cylinders 24 of pick up arm 22. This system is separated from the system operating the other hydraulic cylinders of the invention because of its higher fluid use.

Pump 57 provides pressurized hydraulic fluid through bed tilt control valve 58 in parallel to bed tilt cylinders 59; bale push off control valve 60 controls fluid for operation of bale push off cylinder 61; bale squeeze control valve 62 regulates fluid flow to bale arm adjustment cylinder 38; and push back control valve 63 provides a sub-circuit to operate load rack cylinder 64 and paired push-back cylinders 65. The other details of the operation of the hydraulic circuit are not particularly critical as other known hydraulic circuits may accomplish the same results so long as they have the essential control valves and cylinders indicated. The particular hydraulic control valves indicated are all manually operatable, but in my invention the bale squeeze control valve 62 is also automatically operated by bale position sensing plunger 47 associated with bale plate 33 to activate that switch automatically upon bale presence adjacent the bale plate. That sensing plunger 47 also actuates bale arm lift valve 56.

Having thusly described by invention, its operation may be understood.

Firstly, a bale pick up and accumulator mechanism is formed according to the foregoing specification. The invention is particularly designed as specified for use in picking up, accumulating and stacking larger bales of present day agriculture that amass approximately two thousand pounds of hay in a rectilinear bale configuration commonly eight feet long and either $3 \times 4$ or $4 \times 4$ feet in cross-sectional dimension. Most products baled in the field in such fashion in present day agriculture comprises either hay or some sort of straw from various cereal grain plants. These materials are commonly cut and baled by automatic machinery and the bales left in random array about a field where the baled product originally was grown. Normally when deposited and left by a baling mechanism, the bales will have their longer eight foot dimension horizontally oriented.

The distance between bale arms 39 is adjusted by adjustment valve 62 which activates adjustment cylinder 38 to move the opposed ends of the bale arms toward or away from each other as desired. Commonly most commercial bales will be substantially eight feet in length, so this dimension normally does not need any substantial adjustment. The motion of the bale arms themselves accommodate minor dimensional variations between individual bales. The tilt bed valve 58 is activated to move the tilt bed to its lower accumulation position, if necessary, and the push back control valve will be activated, if necessary, to move the load rack forwardly to its first position to receive the first tier of bales.

My vehicle is moved in a field to approach a vertical side of a bale that is supported on the earth with the eight foot dimension of the bale extending between bale arms 39 and a side of the bale facing the vehicle being substantially adjacent and parallel to bale plate 32 of the pick up mechanism. The vehicle is maneuvered to this position in the traditional fashion heretofore used for steerable agricultural vehicles and the positioning is somewhat enhanced by the bale arms 39 themselves as they angle forwardly and outwardly away from each other to provide somewhat of a funnel-type structure as they approach a bale to tend to move the bale to the desired position, if it be otherwise oriented or the vehicle be somewhat improperly directed. An ordinary driver familiar with farm vehicles needs little, if any, specialized experience to appropriately position my vehicle relative to a bale to be picked up.

Figure 3:
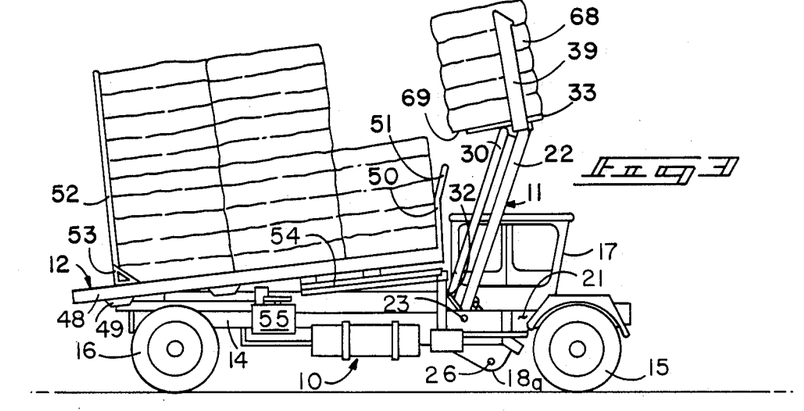
Figure 4:
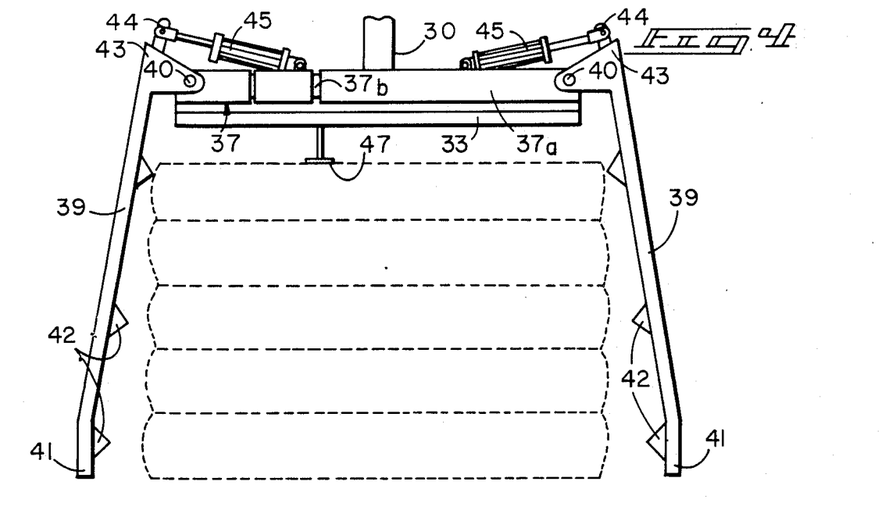
FIG. 4 is an orthographic top view of the bale engaging arms of my invention.
Figure 5:
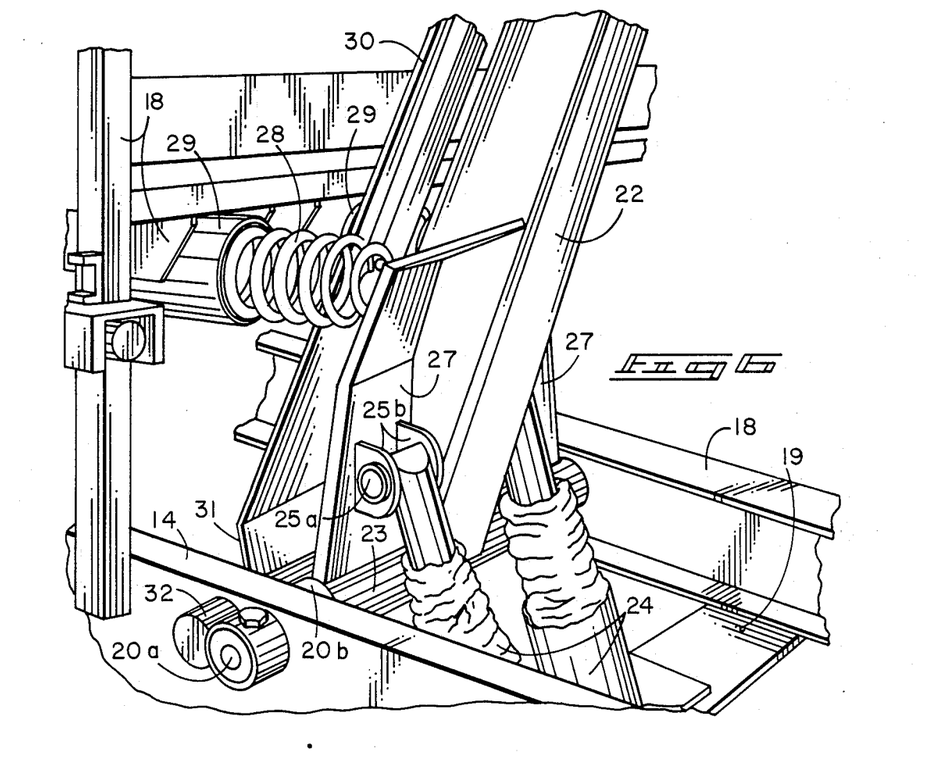
FIG. 5 is an isometric view from a rearward position of the same bale engaging arm structure as illustrated in FIG. 4.
Figure 7:
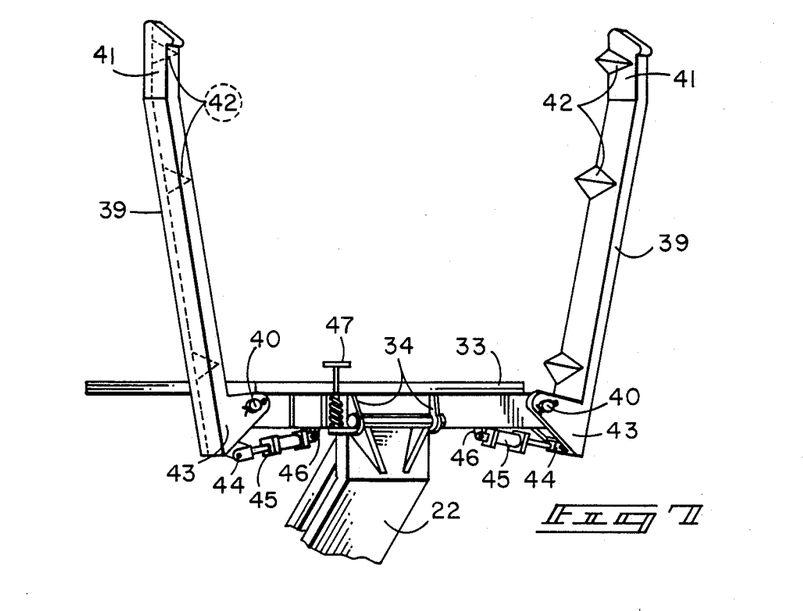
FIG. 7 is a bottom isometric view of the bale engaging arm structure.

With the vehicle and bale positioned as indicated, the vehicle is moved toward the bale until bale plate 38 comes into immediate adjacency with the bale surface 69. As the bale contacts sensor 47 squeeze valve 66 is closed and squeeze cylinders 45 are extended to move the bale arms toward each other to fasten upon the ends of the bale and squeeze the bale therebetween. After a short delay, bale lift switch 56 activates bale lift cylinders 24 and those cylinders extend to move the bale lift arm upwardly and rearwardly to a substantially vertical position immediately forwardly adjacent forward upright structure 50 of the accumulating mechanism 12, as illustrated particularly in FIG. 3 of the drawings.

Figure 1:
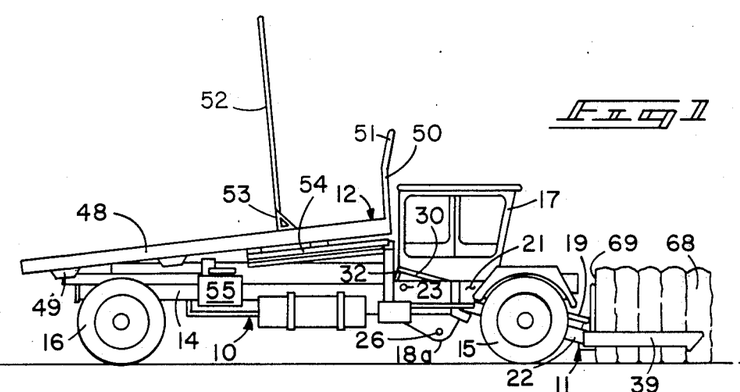
FIGS. 1, 2 and 3 are orthographic side views of my invention showing its various parts, their configuration and relationship, as engaged in a bale loading sequence.
Figure 2:
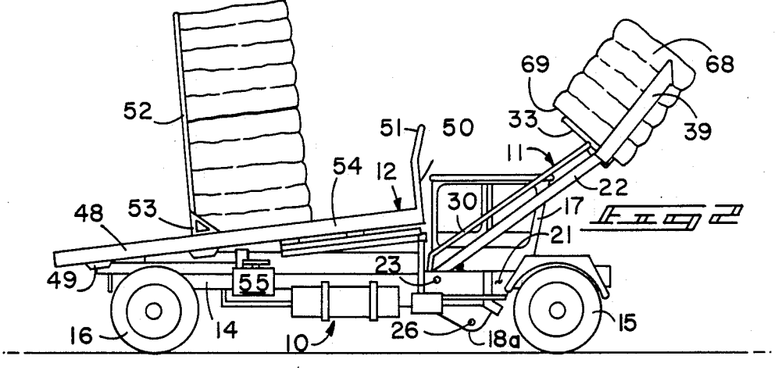

It is to be noted that the angular position of the bale holding structure relative to pick up arm 22 is regulated by control arm 30. Preferably the positional relationships are maintained so that a bale moves substantially in the orientation illustrated in FIGS. 1 through 3, so that as the bale moves rearwardly and upwardly to its accumulation position, the bale plate will be angled slightly rearwardly and downwardly when the pick up arm is vertical so that the bale moves rearwardly off the bale plate both by reason of inertia and the slope of the supporting bale plate. As the pick up arm reaches its maximum rearward position, it activates position sensitive release control valve 70 which in turn removes pressure from squeeze cylinders 45 to release the bale from the pick up structure.

As the first bale is deposited from the pick up arm, it will slide off that arm and into the space between the forward upright structure 50 and rear fence structure 52 to be there positionally oriented with its longer dimension extending in a lateral direction relative to the accumulator vehicle. In the case of 4×4 foot cross-sectional bale, it makes no difference which surface faces downwardly. In the case of a 3×4 foot cross-sectional bale, if the orientation is relevant, the bale may be picked up with proper orientation so that as it moves off the pick up arm the surface immediately adjacent the bale plate of the pick up arm will be downwardly and adjacent the upper surface of the accumulation bed. If necessary, the bale may be turned on the ground manually or by use of the pick up arm structure by appropriate motion of both that structure and the bale.

As the bale pick up and accumulation continues, a second bale will be picked up and deposited in the same fashion, only it will rest substantially immediately above the first bale in the first column of bales. After the second bale is placed, push back control valve 63 is manually operated to move rack 52 rearwardly the width of one bale, either three or four feet as the case may be, and push back cylinder 65 will simultaneously operate to push the two high column of bales rearwardly against the rearward bale rack. The pick up operation is then continued to accumulate an additional column of two bales in vertical relationship and again after this is accomplished, the rearward load rack and both bale columns are moved rearwardly the distance of another bale width so that additional columns of bales may be accumulated in similar fashion. When all columns of bales forming a particular matrix are in place, the accumulator bed is loaded and ready for disposition.

With loaded accumulator bed, the vehicle is moved to a storage site and appropriately positioned to dump the bales. With very little experience, the dumping position can be almost exactly determined by an operator. To dump the accumulated load of bales, the rearward rack structure is moved to the extreme end of the accumulation bed and that bed then raised by operation of valve 58, which activates bed tilt cylinders 59, to tilt the bed in an upward and rearward direction. As this occurs, push off cylinder valve 60 is activated to operate the push off cylinders which push the load from the accumulation bed. The mechanism of this push-off structure is similar to that used for similar purposes in presently existing bale accumulators for smaller bales and therefore is not set forth in detail. The bales may be pushed off in an angulated fashion so ultimately they form a stack two bales high or the accumulation bed may be tilted sufficiently so that the vertical end column of bales becomes the supporting surface and the horizontal rows become vertical columns to provide a stacked array of bales, commonly four bales high and two deep.

Preferably, each of the hydraulic control valves may be operated manually by an operator in an overriding fashion, notwithstanding the potential automatic operation of some or all of them by position sensing control valves. This tends to give more versatility to my invention as it may be necessary to manually override automatic functions at various times during various operations to properly orient bales in unusual or accidental situations. It is most convenient, however, to automatically activate the squeeze cylinders and bale lift arm by reason of initial bale contact and to stop the motion of the squeeze and bale cylinders by a second position sensing control valve that senses the deposit position of the bale.

The foregoing description of my invention is necessarily of a detailed nature so that a specific embodiment of it might be set forth as required. It is to be understood, however, that various modifications of detail, rearrangement and multiplication of parts might be resorted to without departing from its spirit, essence or scope.

Having thusly described my invention, what I desire to protect by Letters Patent, and

What I claim is:

1. A mechanism to pick up and accumulate a plurality of large hay bales, approximating one ton in weight, comprising in combination:

a self-powered vehicle having a frame supported for locomotion by plural wheel trucks, said frame defining a pick up arm channel in its forward portion and having an operator cab laterally adjacent the pick up arm channel and an accumulating and stacking bed rearwardly of the pick up arm channel;

pick up mechanism including an elongate pick up arm pivoted at its inner end upon a fixed axis on the vehicle frame forwardly of the accumulating and stacking bed and movable from a lowered position upwardly adjacent a supporting surface forwardly of the vehicle to a substantially vertical position above the forward portion of said bed, said pick up arm having a bale plate pivotally carried on its forward portion for motion in a plane parallel to the pick up arm, with a control arm pivotally mounted on the frame extending parallel to the pick up arm at a spaced distance thereabove and pivotally connected to the bale plate, said bale plate carrying two pivotally mounted bale arms extending forwardly from each of the lateral sides of the lower portion of the bale plate with hydraulic means of moving said bale arms toward and away from each other and at least one pick up arm return spring carried by the vehicle frame spacedly above its pivotal interconnection with the vehicle frame to contact the pick up arm spacedly forwardly of its vertical position to bias the pick up arm forwardly when it is in its vertical position, wherein each said control arm and pick up arm pivot about a fixed axis relative to said frame, and further wherein each said control arm and pick up arm consists of a single rigid beam;

said bed being pivotally mounted in the rear portion of the vehicle for pivotal motion of its forward portion upwardly and rearwardly to a substantially vertical position, said bed having means to receive a plurality of bales in stacked array in its forwardmost portion, means to move said bales rearwardly and means to tilt said bed to deposit bales thereon in a stacked array on a supporting surface; and hydraulic powering means providing first valve and cylinder means to move the bale arms toward each other to positionally maintain a bale therebetween upon contact of a sensor carried by the bale plate with a bale, second valve and cylinder means to move the pick up arm upwardly and rearwardly upon activation of said first valve and cylinder means, third valve means to release hydraulic pressure on the pick up arm responsive to bale arm vertical position above the forward portion of the stacking bed, and fourth valve means to remove hydraulic pressure from the bale arms.

2. A bale pick up and accumulation mechanism having a self-powered vehicle with a frame having plural wheel trucks to support it for locomotion, an operator cab in a forward lateral portion and a pivotally mounted tiltable accumulation bed rearwardly of the operator cab, the invention comprising:

- a bale pick up arm channel defined in the medial forward portion of the vehicle frame laterally adjacent the operator cab;
- a pick up arm consisting of a single rigid beam pivotally mounted on the vehicle frame about an axis fixed relative to said frame immediately forwardly of the forward edge of the accumulation bed for motion in the pick up arm channel, said pick up arm having
  - first hydraulic means for moving said arm from a first downward position spacedly adjacent the supporting surface forwardly of the vehicle to a second rearward, substantially vertical position above the forward edge of the accumulation bed,
- spring means carried by the vehicle frame spacedly above its pivotal interconnection with the pick up arm to bias the pick up arm forwardly from its second position,
- a control arm consisting of a single rigid beam pivotally carried by the vehicle frame about an axis fixed relative to said frame, said control arm extending substantially parallel to the pick up arm at a spaced distance thereabove,
- a bale plate pivotally carried at its lower edge by the pick up arm and pivotally communicating in its medial portion with the control arms,
- a compound elongate bale arm beam carried by the lower rearward portion of the bale plate, said bale arm beam having one member slidably extensive relative to the other member, with second hydraulic means for moving said bale arm beam portions relative to each other,
- bale arms pivotally mounted on the lateral end portions of the bale arm beam and extending forwardly thereof, and
- third hydraulic means for moving said bale arms toward and away from each other to hold a bale therebetween responsive to bale position relative to the bale plate, and
- first valve means to remove hydraulic pressure from the pick up arm responsive to the upward rearward position of the pick up arm, and second valve means to release a bale carried by said bale arm responsive to upward rearward position of the pick up arm.

* * * * *